US011586753B2

(12) United States Patent
Sullivan et al.

(10) Patent No.: US 11,586,753 B2
(45) Date of Patent: *Feb. 21, 2023

(54) SECURE CONTENT ACCESS SYSTEM (71) Applicant: Beatport, LLC, Denver, CO (US)

(72) Inventors: Sean M. Sullivan, Denver, CO (US); Natalie A. Wolfe, Portland, OR (US); Michael R. McConnell, Portland, OR (US)

(73) Assignee: BEATPORT, LLC, Denver, CO (US)

( * ) Notice: Subject to any disclaimer, the term of this patent is extended or adjusted under 35 U.S.C. 154(b) by 122 days.

This patent is subject to a terminal disclaimer.

(21) Appl. No.: 16/935,059

(22) Filed: Jul. 21, 2020

(65) Prior Publication Data

US 2020/0349273 A1 Nov. 5, 2020

Related U.S. Application Data

(63) Continuation of application No. 15/664,671, filed on Jul. 31, 2017, now Pat. No. 10,719,616.
(Continued)

(51) Int. Cl.
*G06F 21/62* (2013.01)
*H04L 9/32* (2006.01)
(Continued)

(52) U.S. Cl.
CPC ........ *G06F 21/6218* (2013.01); *G06F 21/602* (2013.01); *H04L 9/065* (2013.01);
(Continued)

(58) Field of Classification Search
None
See application file for complete search history.

(56) References Cited

U.S. PATENT DOCUMENTS 7,779,097 B2 8/2010 Lamkin et al.
8,813,238 B2 8/2014 So et al.
(Continued)

FOREIGN PATENT DOCUMENTS

EP 2280524 A2 2/2011
WO 02101494 A2 12/2002

OTHER PUBLICATIONS

PCT International Search Report and Written Opinion of the International Searching Authority issued in International Application No. PCT/US2013/027198, dated Jul. 18, 2013 (17 pages).

*Primary Examiner* — Brandon Hoffman
(74) *Attorney, Agent, or Firm* — Miller Nash LLP (57) ABSTRACT

A method for communicating between a client application and a license-governing application. The method includes receiving a request at a content application from the client application to access media content from the license-governing application, generating a message at the content application to the license-governing application to request client authentication, and receiving at the content application a client authorization token from the license-governing application. A message is generated at the content application to the client application to request user authentication, and the content application receives an authorization code from the client application. The method further includes generating a message at the content application to the license-governing application with the authorization code to request an access token, receiving the access token at the content application from the license-governing application, and granting access at the content application to the media content based on the access token.

9 Claims, 12 Drawing Sheets

Related U.S. Application Data

(60) Provisional application No. 62/412,799, filed on Oct. 25, 2016.

(51) Int. Cl.
*H04L 9/14* (2006.01)
*G06F 21/60* (2013.01)
*H04L 9/30* (2006.01)
*H04L 9/06* (2006.01)
*H04L 9/08* (2006.01)

(52) U.S. Cl.
CPC ............. *H04L 9/0825* (2013.01); *H04L 9/14* (2013.01); *H04L 9/30* (2013.01); *H04L 9/3226* (2013.01); *H04L 2209/60* (2013.01)

(56) References Cited

U.S. PATENT DOCUMENTS

| | | |
|---|---|---|
| 9,240,945 B2 | 1/2016 | Kumar et al. |
| 2005/0132204 A1* | 6/2005 | Gouguenheim ...... H04L 9/0877 713/193 |
| 2005/0278259 A1* | 12/2005 | Gunaseelan ............ G06F 21/10 705/59 |
| 2007/0156726 A1 | 7/2007 | Levy |
| 2009/0327720 A1* | 12/2009 | Cathro ................ G06F 21/6209 713/168 |
| 2010/0057563 A1 | 3/2010 | Rauber et al. |
| 2011/0213971 A1 | 9/2011 | Gurel et al. |
| 2014/0223099 A1* | 8/2014 | Kidron ................ G06F 12/0806 711/118 |

* cited by examiner

SECURE CONTENT ACCESS SYSTEM

CROSS-REFERENCE TO RELATED APPLICATIONS

This application is a continuation of U.S. non-provisional patent application Ser. No. 15/664,671, filed Jul. 31, 2017, which issued on Jul. 21, 2022 as U.S. Pat. No. 10,719,616, titled "SECURE CONTENT ACCESS SYSTEM," which is a non-provisional of and claims benefit from U.S. provisional patent application No. 62/412,799 filed Oct. 25, 2016, titled "SECURE CONTENT ACCESS SYSTEM," the disclosures of both of which are incorporated herein by reference in their entirety.

FIELD OF THE INVENTION

This disclosure is directed to systems and methods for integrating a license-governing application with a client application via a software development kit (SDK) or a content application.

BRIEF DESCRIPTION OF THE DRAWINGS

Aspects, features and advantages of embodiments of the present disclosure will become apparent from the following description of embodiments in reference to the appended drawings in which.

DETAILED DESCRIPTION

This disclosure is related to a secure content access system. In particular, it is oriented towards serving the amateur and professional disc jockey (DJ) and producer markets worldwide. The system comprises two major components. The first component is an internet based network services for providing access to a content catalog, user account management, content fulfillment and delivery, content digital rights management, usage tracking, and reporting for royalty payments. The second component is an SDK that provides third-party developers the tools for integrating their software and hardware platforms, including methods for securely storing content for playback without an internet connection, on-the-fly encryption and decryption of content during download and playback on client platform, and methods for interacting with the internet based network services. Integrations may be made on a plurality of platforms, including, but not limited to, MacOS, Microsoft Windows, Apple iOS, Android, etc. Media content may include audio, video, and combined audio and video content, such as songs, podcasts, speeches, programs, pictures, videos, movies, and portions or clips of all of the above.

Embodiments of the disclosure allow for direct integration of music content and locker technology with third party software applications on desktop and mobile platforms. Other features include a modular content ingestion system for catalog metadata and other feeds, media metadata catalog and content fulfillment and delivery, session security using rotating encrypted tokens, and secure offline music delivery and rights management. Further still, the features include content delivery via RTMP/HLS/HTTP or other protocol streams and conditional downloads, highly scalable and fast catalog search, simple playlist management module, and human curated featured content by genre or other taxonomic classification methods.

Media access may be provided in two modes—online and offline. The online mode allows access to the media content, such as music and/or video, and stream the content through a controlled web site, or partner application built using the SDK described below. In some embodiments, a maximum number of concurrent streams may be permitted. For example, some embodiments may allow only four concurrent streams to be permitted.

The offline mode allows access to media content without an internet connection using embodiments described below. A user may sync their device with a license governing application, for example, downloading all songs or videos marked by the user for offline access. The downloaded content may be stored in an encrypted form and only be accessed by an authorized application, with the correct application key, and user account with a valid user license. Each user on a given device may have their own private account, and no content sharing is then possible. U.S. patent application Ser. No. 13/773,600, entitled "METHOD AND APPARATUS FOR LIMITING ACCESS TO DATA BY PROCESS OR COMPUTER FUNCTION WITH STATELESS ENCRYPTION" filed Feb. 21, 2013, incorporated herein by reference in its entirety, discusses online and offline content usage and systems and methods related to data rights management (DRM) content usage mechanisms.

Figure 1:
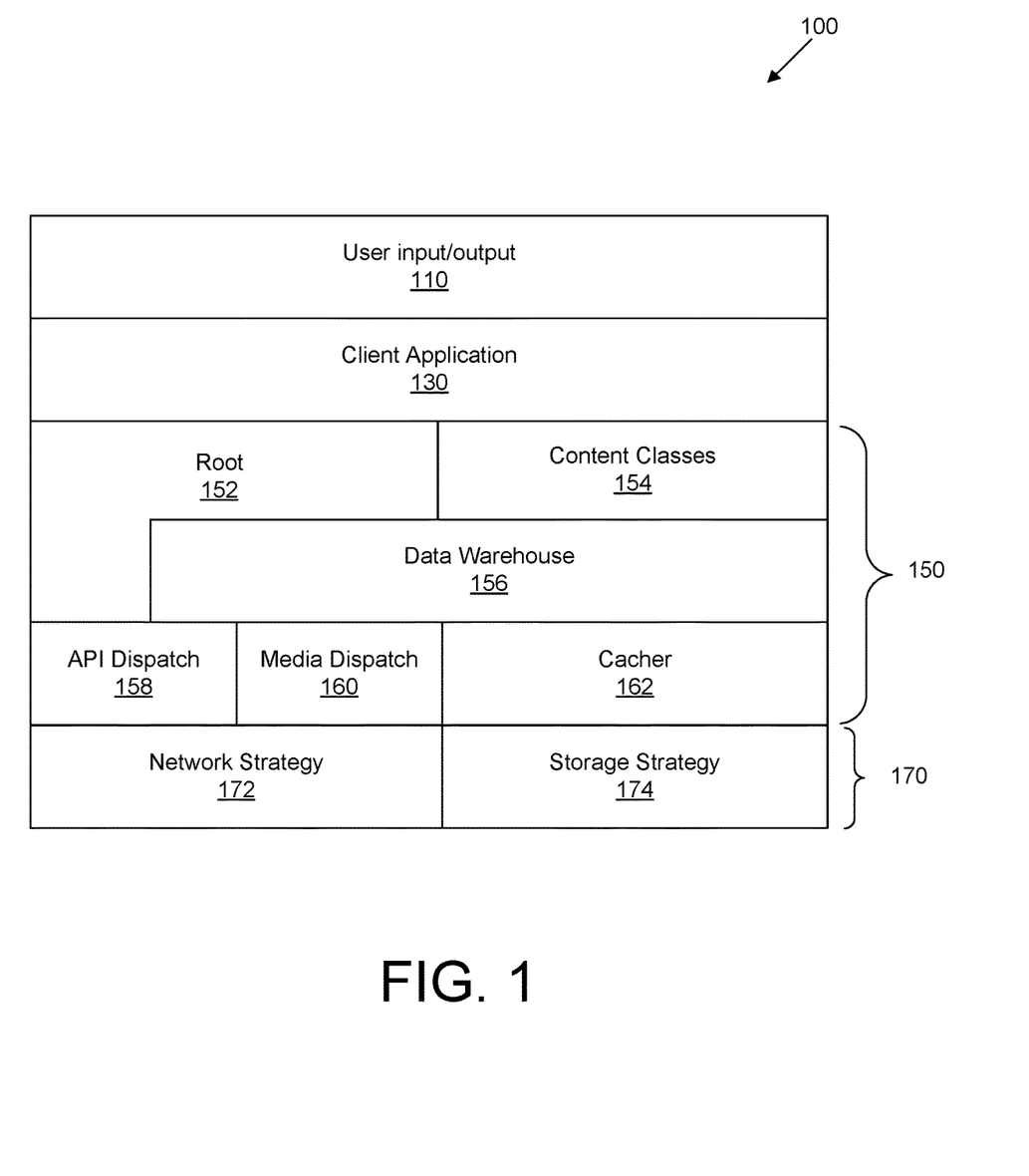
FIG. 1 is an exemplary block diagram of a SDK application stack in a client device according to some embodiments of the disclosure.

FIG. 1 illustrates an example of an SDK application stack 100 according to some embodiments of the disclosure. The SDK application stack 100 includes a user input/output 110, a client application 130, a SDK 150, and a platform 170. The SDK 150 may be provided by a license-governing application service to provide media content through the client application 130 to the user input/output 110. The SDK may also be called a client application and interacts with both the client application 130 and a remote license-governing application. The SDK 150 is linked into the client application 130 on user hardware to provide a tightly integrated experience and access to licensed content within the client application 130.

The client application 130 includes a unique application ID, which can be stored in the application code. In addition to the unique application ID, an application public key may also be stored in the application code or a memory on the client device. The application public key is used when fetching a user's license, for example. Remote servers use a private half of the application public key to sign the encrypted license before transmitting the encrypted license to a client. The application public key is provided by the license-governing application to the client application 130. The client application public key may be revoked by the license-governing application if desired to cut off access to the licensed content, such as if a subscription has expired.

The SDK 150 includes a root block 152, a content classes block 154, a data warehouse 156, an API dispatch 158, a media dispatch 160, and a cacher 162. The platform 170 includes a network strategy 172 and storage strategy 174 to implement networking local storage, and task scheduling.

A license-governing application, remote from the client device, authenticates users for using media content. In some embodiments, the license-governing application may use open authorization (OAuth) in combination with a rotating authorization token system to authenticate a user. The SDK 150 performs the first and last steps of the authentication, but the client application 130 implements a web view to process the middle steps of the authentication.

Figure 2:
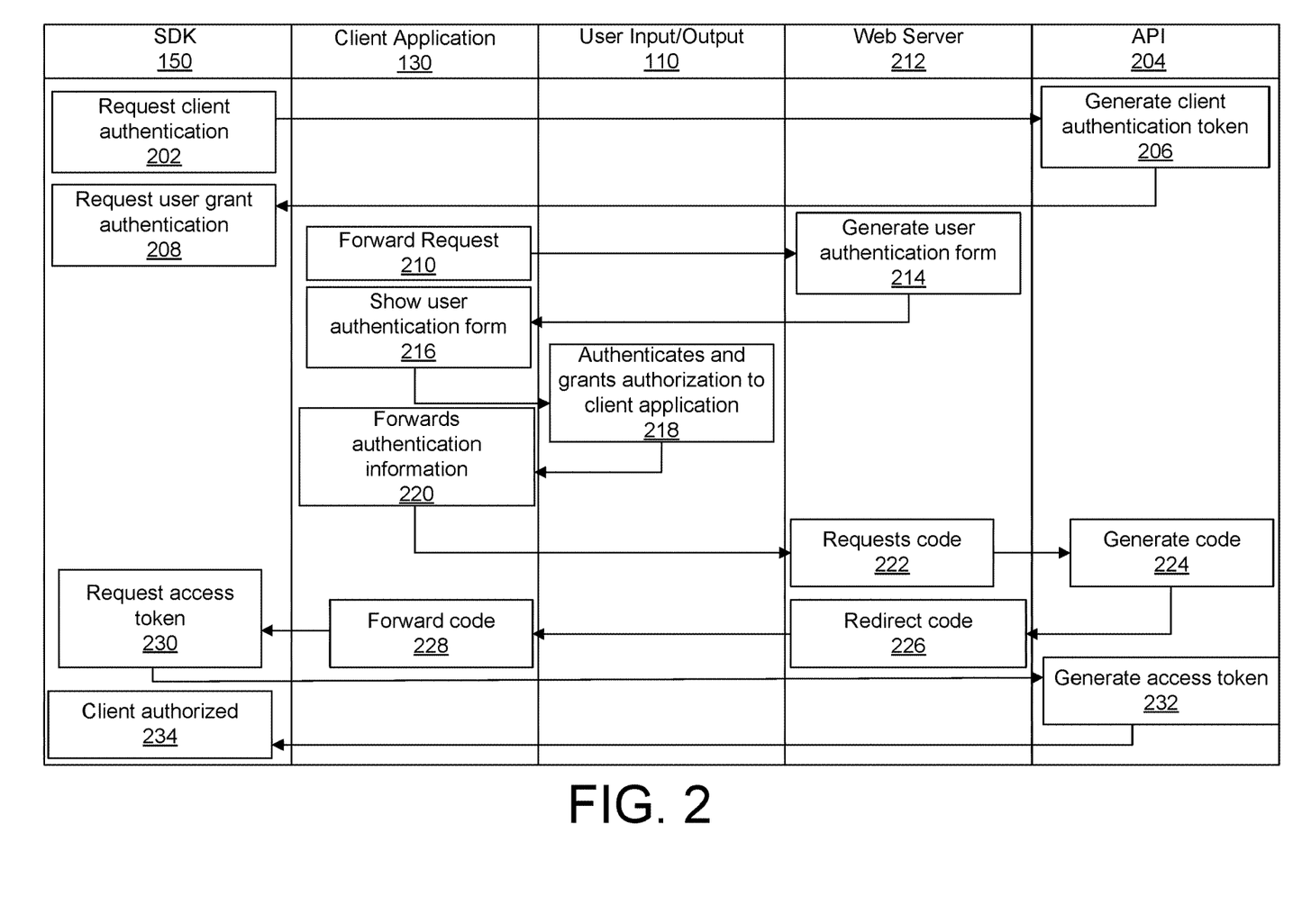
FIG. 2 is an exemplary flow chart for authenticating a user for access to media content through a license-generating application according to some embodiments of the disclosure.

FIG. 2 illustrates an example authorization sequence. The SDK 150 receives a request from the user input/output 110 to begin authorization. The SDK 150 sends a request for client authorization 202 to an API server 204 through the root block 152 and the API dispatch 158. The API server 204 generates a client authorization token 206. The SDK 150 receives the client authorization token and requests user grant authentication 208 to the client application 130.

The client application 130 forwards the request 210 to a webserver 212, which generates a user authentication form 214. The client application 130 displays the user authentication form 216 through the user input/output 110. The user authenticates and grants authorization to the client 218, and the client application 130 forwards 220 the authorization information to the web server 212. The web server 212 requests code 222 from the API server 204, and the API server 204 generates code 224 and forwards it so the web server 212 which redirects 226 the code to the client application 130, along with the application ID to the API dispatch 158.

The client application 130 forwards the code 228 to the SDK 150 which requests an access token 230 from the API server 204. The API server 204 generates the access token 232 and the client is then authorized 234 in the SDK 150. The access token 232 is a singleton instance maintained by the root block 152 and integrating applications should not try to copy or move the access token 228.

If the authorization sequence results in a new registration, the client authorization token 206 is used to associate a new user with the client application 130. The client authorization token 206 may only be valid for a predetermined amount of time, such as 10 minutes. If a user takes longer than the predetermined amount of time to login, the SDK 150 must refresh the session again by requesting client authorization.

Figure 3:
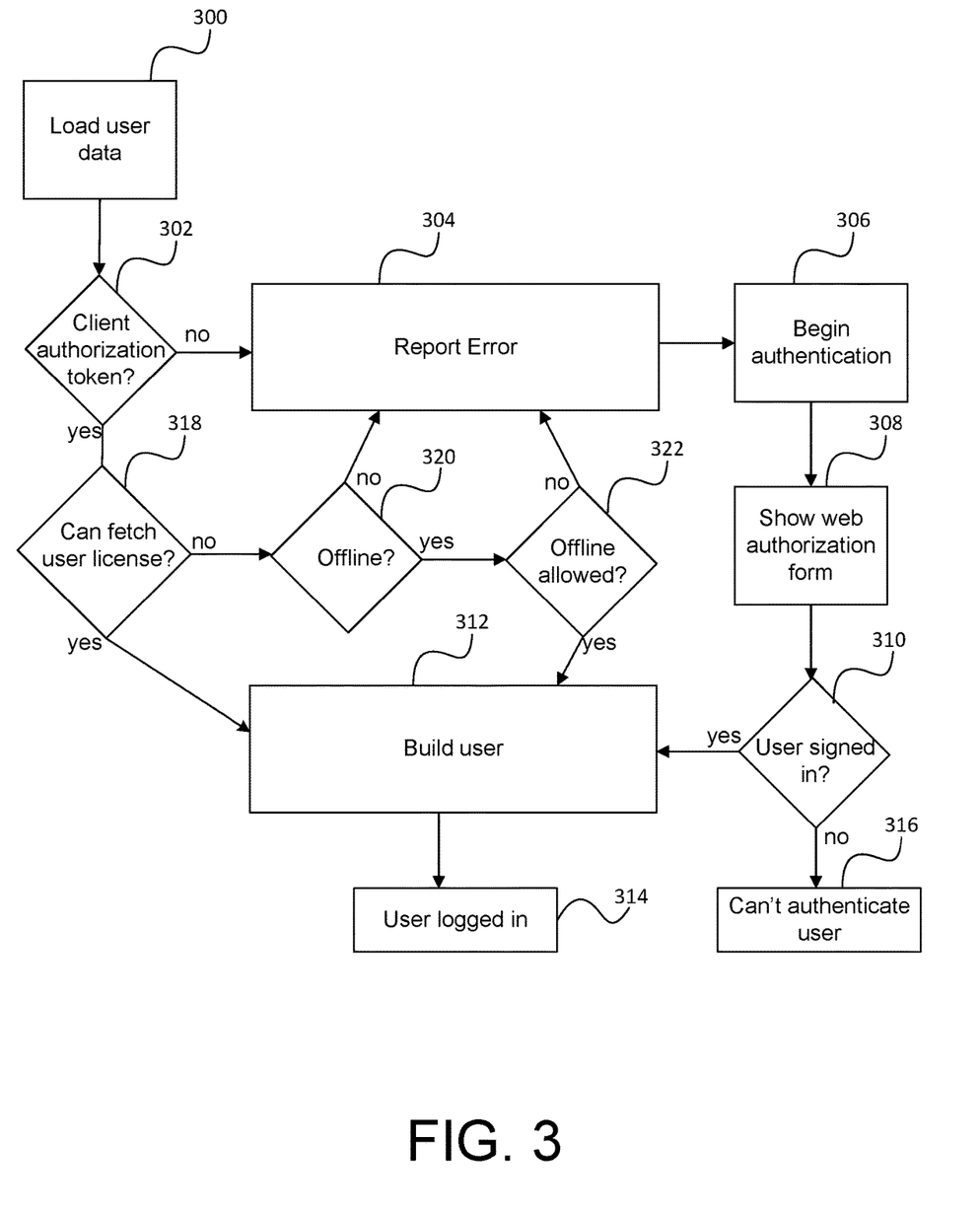
FIG. 3 is another exemplary flow chart for authenticating a user for access to media content according to some embodiments of the disclosure.

FIG. 3 illustrates a flow chart for authenticating a user in the SDK 150. The SDK 150 loads 300 the user data and checks 302 to see if there is a client authorization token present. If there is no client authorization token, the SDK 150 reports 304 an error and then begins 306 a user authorization procedure, such as the procedure outline in FIG. 2, for example. The web authorization is shown 308 to the user and the method checks 310 to see if the user has signed in. If yes, a user profile is built 312 and the user is logged in 314. If not, an error is reported 316.

If there is a client authorization token, the SDK 150 determines 318 if a license can be fetched. If yes, the user profile is built 312 and the user is logged in 314. If no, the SDK 150 checks 320 if the user is offline. If no, an error is reported 304 and the user authorization procedure begins 306. If yes, the SDK 150 determines 322 if offline access is allowed. If no, an error is reported 304 and if yes, the user profile is built 312 and the user is logged in 314.

As discussed above, content can be accessed either in an online mode or an offline mode. Online content is requested on-demand and is stored in a local cache temporarily for performance reasons. Offline content persists in a locker and can be played with or without an internet connection, while online requires an internet connection.

The license-governing application's platform is designed in a manner that eliminates the need for a content file to exist in a decrypted form in its entirety. This is accomplished through on-the-fly decryption of buffers. When content access is requested, the SDK 150 presents the content to the client application 130 as a standard file object. Behind the scenes, however, the SDK 150 determines the location of the content, downloads it if necessary, validates the license, creates streaming buffers, and then decrypts the stream as the client application 130 plays the content.

This creates a high performance and low latency method of providing a client random access to the media while preserving security by not requiring full decryption of the file for access by the client application 130.

There are two components to the content licensing model employed by the license-governing application through the locker: a server-side implementation through the REST API, and a client-side implementation through the SDK 150. In some embodiments, the server-side code may be based on Advanced Encryption Standard (AES) or Rivest-Shamir-Adleman cryptosystem (RSA) encryption algorithms. The client devices may employ secure socket layer (SSL) or transport layer security (TLS) encryption.

Access to the content is controlled by subscriptions, licenses, temporary tokens, and refresh tokens. Subscriptions are renewed at regular intervals, such as monthly, yearly, or some other time period. The subscriptions are used by the license-governing application and are tied to a specific user and limits the features of the user. A license is also tied to a specific user and limit the features of the user, as well as tied to a specific client application 130 and is used by the SDK 150.

A temporary token expires quickly and has a general usage. A refresh token has a long time-to-live (TTL) and specialized usage. However, both a temporary token and a refresh token identifies a user and is used by the API.

In some embodiments, the client application 130 generates an RSA key pair by passing along the application public key. When the SDK 150 makes an API request through the API dispatch 158 to obtain a license, the SDK 150 passes the application public key to the license-governing application server for encrypting the license. The RSA key pair generation should be done before any attempt is made at getting access to content while in an offline mode. That is, RSA key pair generation is required once per user locker on the client device.

Figure 4:
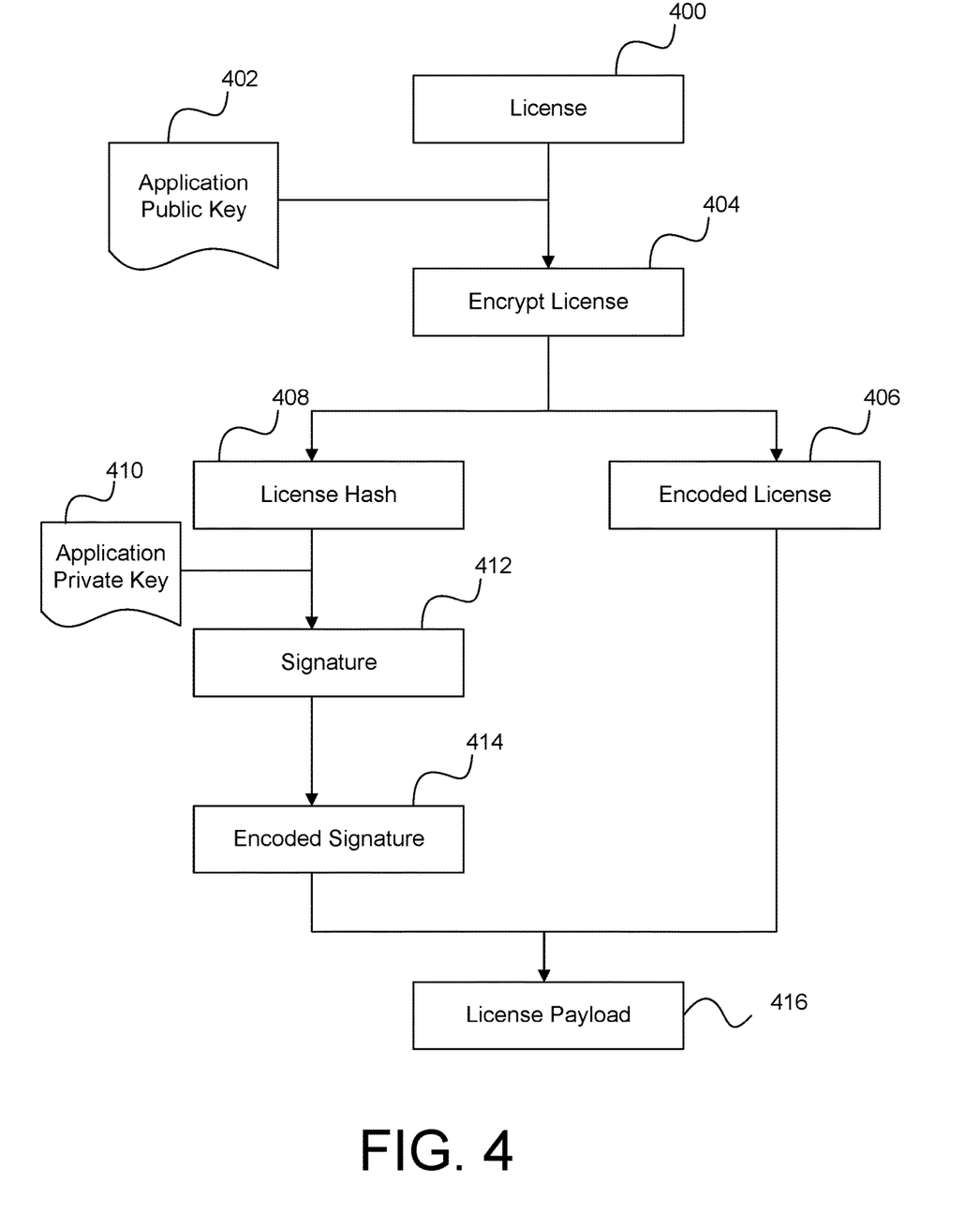
FIG. 4 is an exemplary flow chart for generating a license at the license-governing application server according to some embodiments of the disclosure.

When a user signs up for a subscription at the license-governing application, which requires being online, a license is generated at the license-governing application server. FIG. 4 illustrates the process for generating the license at the license-governing application server. The license-governing application server initially generates the license 400. Then, using the application public key 402, the license-governing application server encrypts the license with the application public key 402 and generates the encrypted license 404.

The license-governing application server encodes the license, generating an encoded license 406 for HTTP transmission, and the also calculates a sum from the encrypted license 404 to generate a license hash 408. Using the client application private key 410, the license-governing application server signs the license hash 408 to generate a signature 412. The signature 412 is encoded to create an encoded signature 414 for HTTP transmission. The encoded signature 414 and the encoded license 406 are then transmitted in a license payload 416 to the client device.

Figure 5:
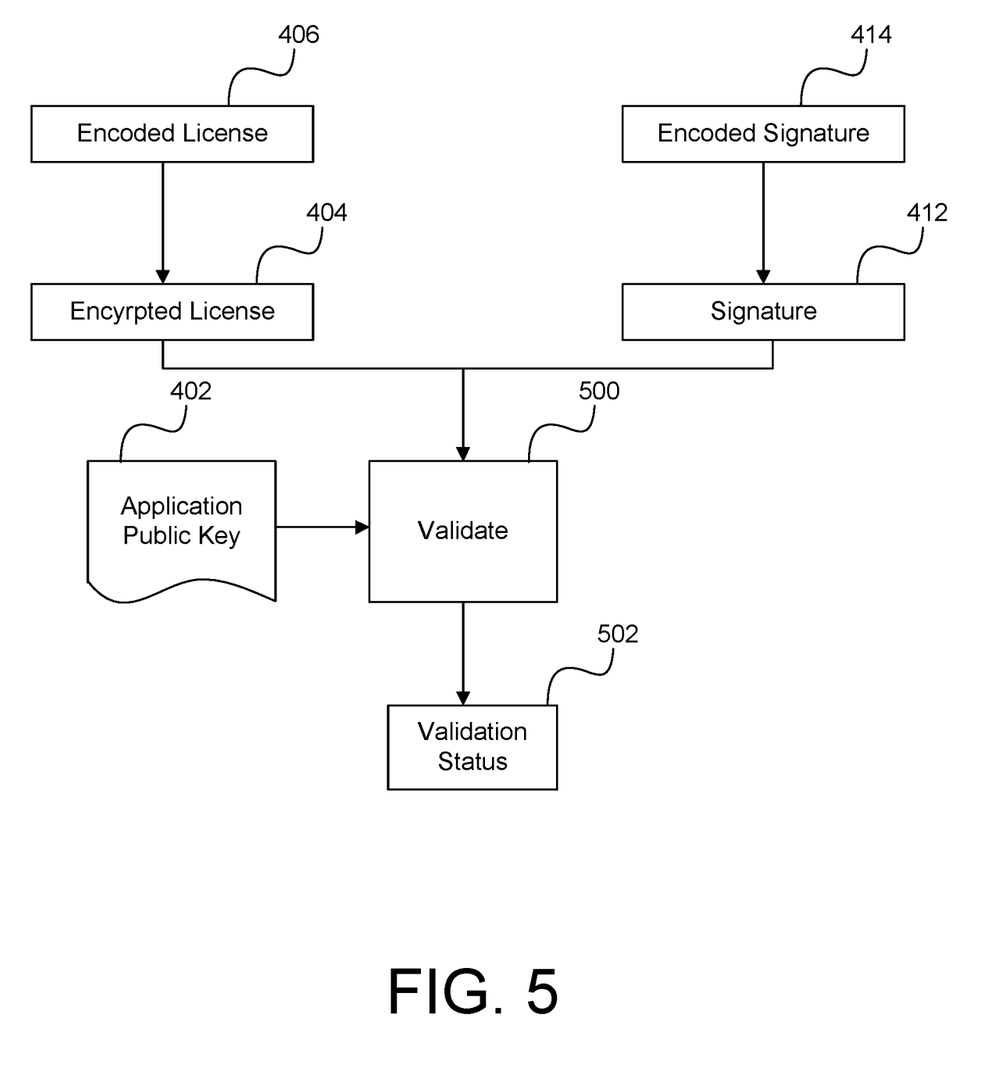
FIG. 5 is an exemplary flow chart for validating the license according to some embodiments of the disclosure.

FIG. 5 illustrates a flow chart for validating the license at the client device via the client application 130. The authenticity of the license is validated prior to parsing the license by the SDK 150 or granting offline access to content provided by the license-governing application. The encoded license 406 and the encoded signature 414 are decoded to determine the encrypted license 404 and the signature 412. The client application public key 402 is used to validate 500 the license and generate a validation status 502.

Figure 6:
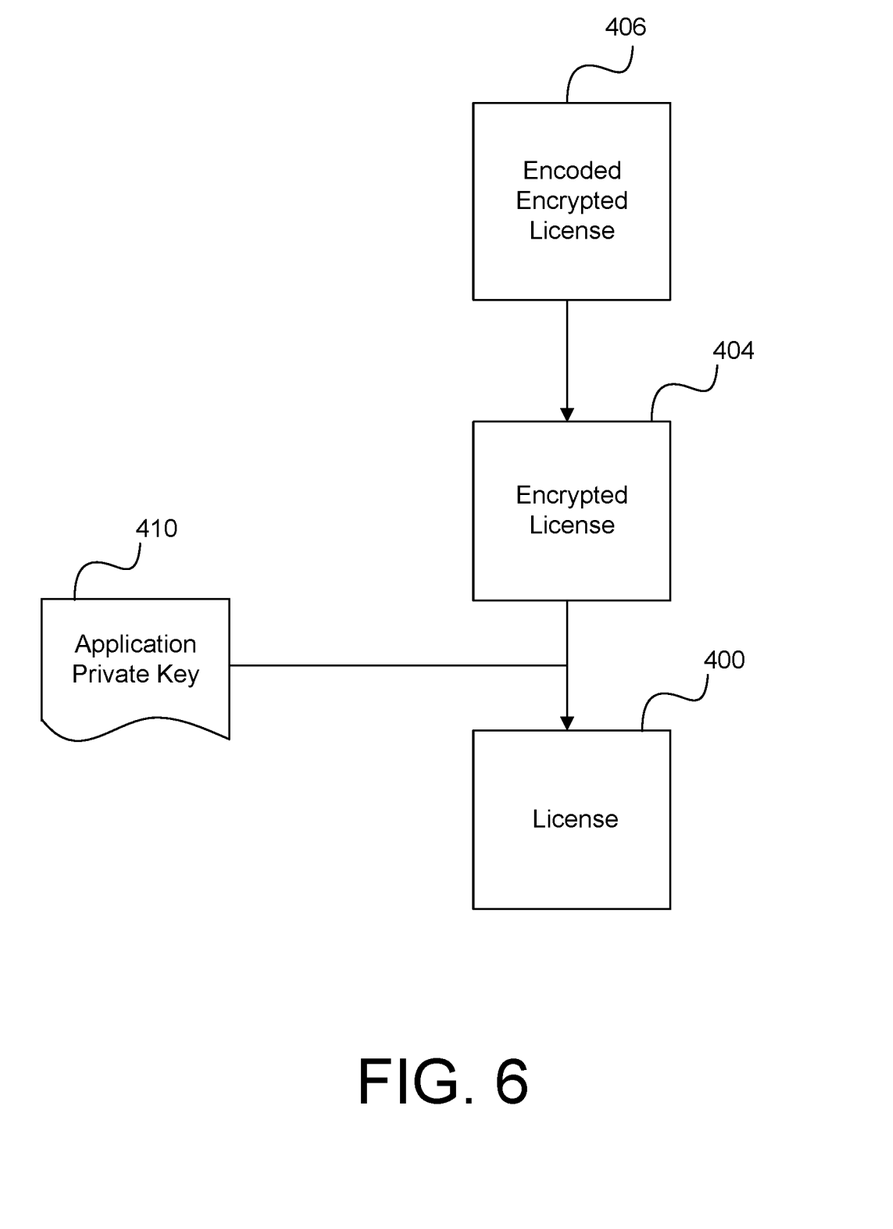
FIG. 6 is an exemplary flow chart for decrypting the license once it has been validated according to some embodiments of the disclosure.

FIG. 6 illustrates a flow chart for decrypting the license once it has been validated. The encoded license 406 is decoded to determine the encrypted license 404. Then, using the client application private key 410, the license 400 is decrypted. The decrypted license 400 may be sent to the SDK 150 for use.

The license 400 includes a data structure having fields such as a user identification, client application identification, number of streams permitted, subscription type, license validity and expiration date, passwords, an indicator that tells the client application 130 whether offline access is allowed, and the number of times the license has been refreshed.

For a user to gain access to the media in an offline mode, the offline access must be set to true in the license. Further, the expiration date must be greater than the current date and time, the start date must be less than the current date and time, and the application identification must be equal to the application identification in the client application 130.

Media content, such as songs, are stored on the client device's local storage and may be encrypted with strong encryption. Encryption of the media content may be done in a variety of ways, as understood by one skilled in art. For example, in some embodiments, encrypting may be done using a counter (CTR) mode of AES 256, as there are many benefits for such an encryption. For example, any block size is simple to encrypt and decrypt, as there is no need to align, justify, or buffer extra blocks. Further, random access of any size to any specific bytes in the file are accessible. There is no need to buffer or use chained keys and byte offsets in the file are easily accessible by translating the byte offset into a counter value.

AES encryption requires a key and initialization vector (IV). To simplify implementation details, the license-governing application may generate unique IVs for each song and a fixed encryption key. The fixed encryption keys and the IVs are derived from invariant data, mitigating the need to re-encrypt song data in the event of a new subscription and/or license. Additionally, generating unique IVs for each song increases the difficulty of brute force decryption if the fixed encryption key has been compromised.

Figure 7:
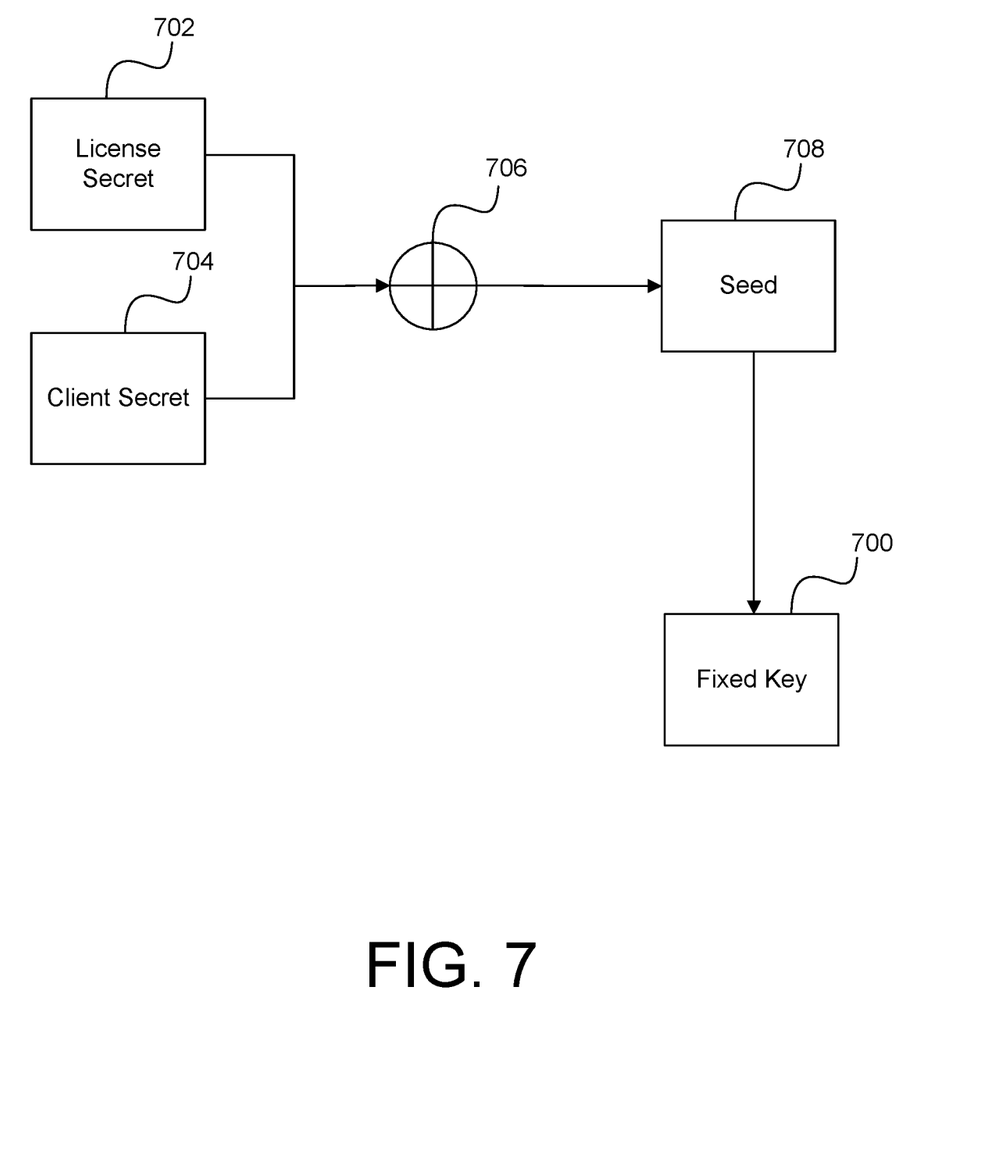
FIG. 7 is an exemplary flow chart for generating a fixed encryption key according to some embodiments of the disclosure.

FIG. 7 is a flow chart illustrating generation of the fixed encryption key 700. The fixed encryption key 700 is derived from a portion of data inside the license, referred to herein as license secret 702. A client secret 704, which may consist of a number of bytes, such as 16, is hidden in the client application 130 memory.

To derive the fixed encryption key 700, the license is first validated and decrypted, as shown in FIGS. 5 and 6, for example. Next, the secret license 702, also referred to as a secret data field, is extracted from the license 400. The secret license 702 and the client secret 704 are combined using a Boolean function 706, which may be an AND, OR, NAND, NOR, XOR or XNOR function, to create a seed 708 for the fixed encryption key 700. The seed 708 is transformed into the fixed encryption key 700 using a number of steps, such as iterative processing with encryption, reversing, and truncation, as is known in the art.

This results in a strong fixed encryption key 700 that is both time consuming and very difficult to exploit. Even if an attacker finds the fixed encryption key 700, the attacker would need to know the initialization vector, which varies from song-to-song. The fixed encryption key 700 may be extracted when the user first uses the license-governing application online or offline, and may be kept in memory.

Figure 8:
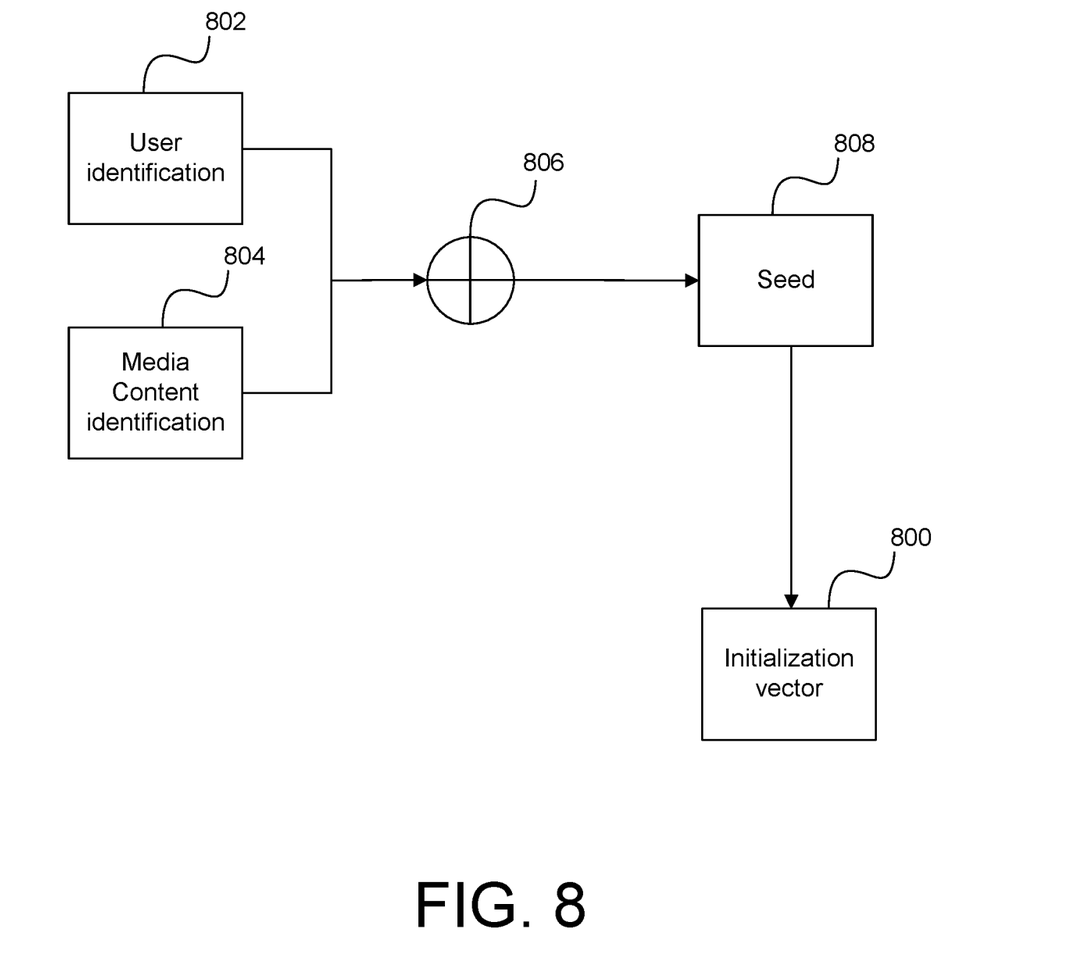
FIG. 8 is an exemplary flow chart for generating an initialization vector according to some embodiments of the disclosure.

FIG. 8 is a flow chart illustrating generation of an IV 800. As mentioned above, IVs are generated on a per song basis and are derived from an active user ID 802 and a media content ID 804. To derive the IV, the SHA256 sum of the user ID 802 and the media content ID 804 is taken. The two hash sums are combined with a Boolean function 806, such as the functions mentioned above, into a seek 808. A transformation is applied, as also discussed above, to generate the IV 800. In some embodiments, generating the IV is done on-the-fly, rather than keeping the IV as a permanent resident in memory for each song. If clients are doing many small reads, however, performance may suffer by generating the IV in such a manner, and the IVs may then be stored in memory.

Figure 9:
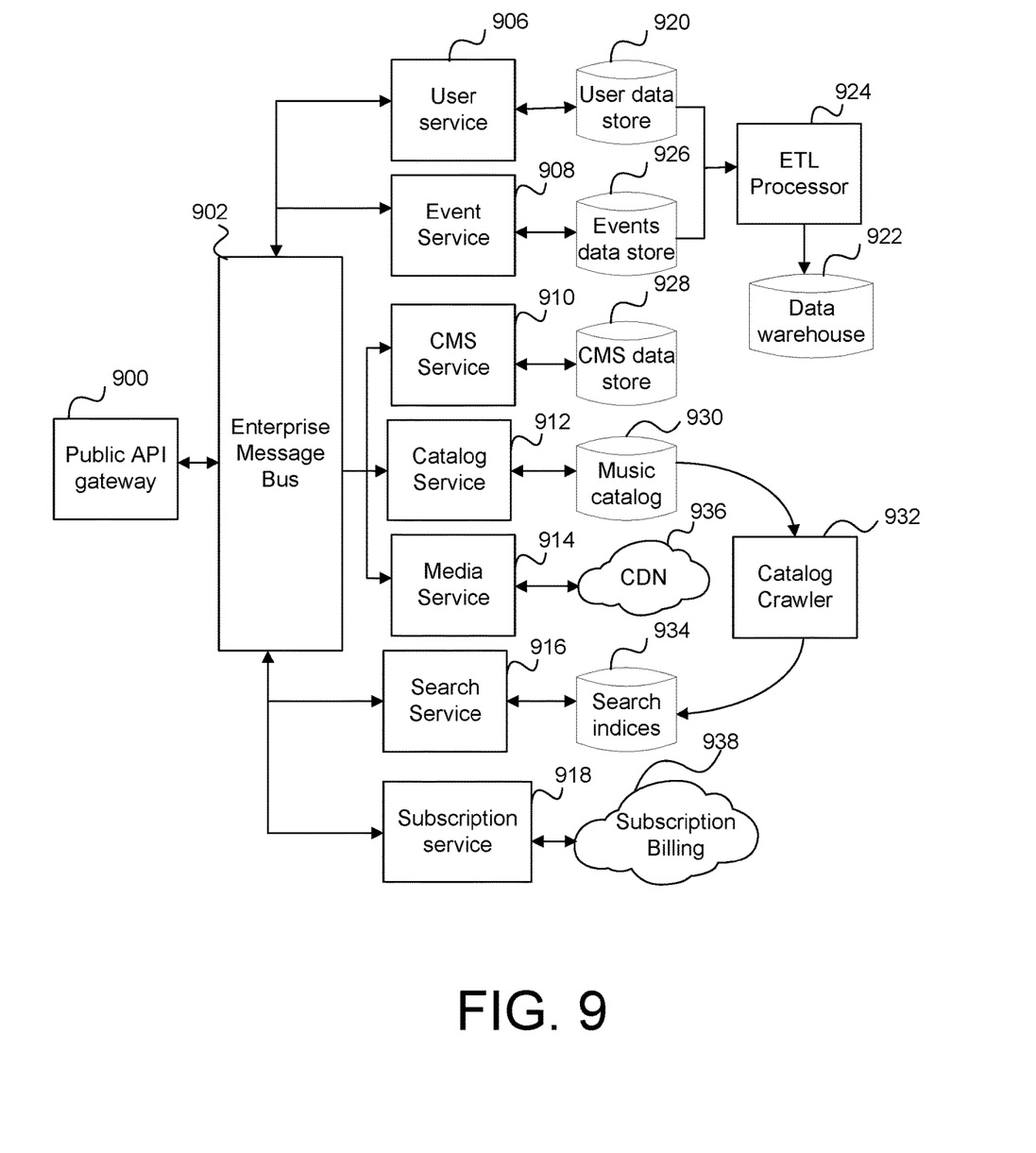
FIG. 9 is a block diagram of a license-governing application according to some embodiments of the disclosure.

FIG. 9 illustrates a block diagram of a high-level overview of services provided by a license-governing application. The arrows in FIG. 9 indicate the direction of message flow between the services. Some services are bi-directional while others are uni-directional.

The public API gateway 900 may be delivered the license-governing application having been developed as a service oriented architecture (SOA). Features of a quality SOA include using strict service boundaries, common message bus for inter-service communication, stable service interfaces, and changeable service components.

A service boundary basically defines the edge of a service, or its interface that is presented to the cloud. In an SOA, strict service boundaries ensure stability in communication between services via the enterprise message bus 902. The signatures of functions published in each service should be well thought out and change slowly over time. Ideally, existing signatures should change very slowly, while adding new functions can happen more frequently. Thus, services are less likely to break or require changes to other services when new components are added or changed.

The greatest benefit of this approach will be found with the partner software applications. Backward compatibility with older SDK versions may be maintained by using quality SOA principles.

The enterprise message bus 902 is a technology layer that facilitates communication between the public API gateway 900 and the various services that make up a license-governing application. The message bus allows various services to subscribe to specific channels to send and receive messages. Additionally, the message queue system may archive messages for replaying if some sort of problem arises, reducing the likelihood of lost data.

A service represents a self-contained unit of business logic and a data store. Each service is responsible for specific functional areas of the license-governing application's product offerings. A service is composed of three tiers: the service interface, components, and the data store.

The service interface is similar to the service boundaries described earlier. It publishes available functions for the given service that can be subscribed to by other services.

Components are the software modules within the service that actually perform tasks. Components are designed to change frequently with minimal changes to the interface.

The data store may be technology independent. It is a logical container that stores data managed by the service. Any other service requiring access to that data would issue a request to the data's owner and that specific service would respond to the request. This provides a stable, clean, and consistent means of accessing data.

Example services that may be included are a user service 906, an event service 908, a content management system (CMS) service 910, a catalog service 912, a media service 914, a search service 916, and a subscription service 918.

The user service 906 is responsible for managing user accounts. The user service 906 includes account registration and onboarding services, account management, password management, user authentication, etc. User accounts may be tracked by geographic territory based on country and postal code. All user account data is stored in the user data store 920. This information is eventually fed into the data warehouse 922 via an extraction transformation load (ETL) processor 924 for analytics and reporting and stored in a business intelligence data warehouse 926.

The event service 908 processes a wide variety of event driven messages from the API and SDK applications. For instance, one of the most common event messages that is processed is based on song play events including things such as song play, pause, seek, eject, etc.

Event messages are one way only, meaning that other API services and the SDK will fire off messages to this service without an expectation of a response. Messages are queued by the service and processed into an events data store 926 and into the ETL processor 924.

The CMS service 910 is connected to a CMS data store 928 and the catalog service 912 is connected to a music catalog 930. The music catalog 930 is connected to a catalog crawler 932 which connects to search indices 934, connected to the search service 916. The media service 914 is connected to a content delivery network (CDN) 936. The subscription service 918 is connected to subscription billing platform 938.

Figure 10:
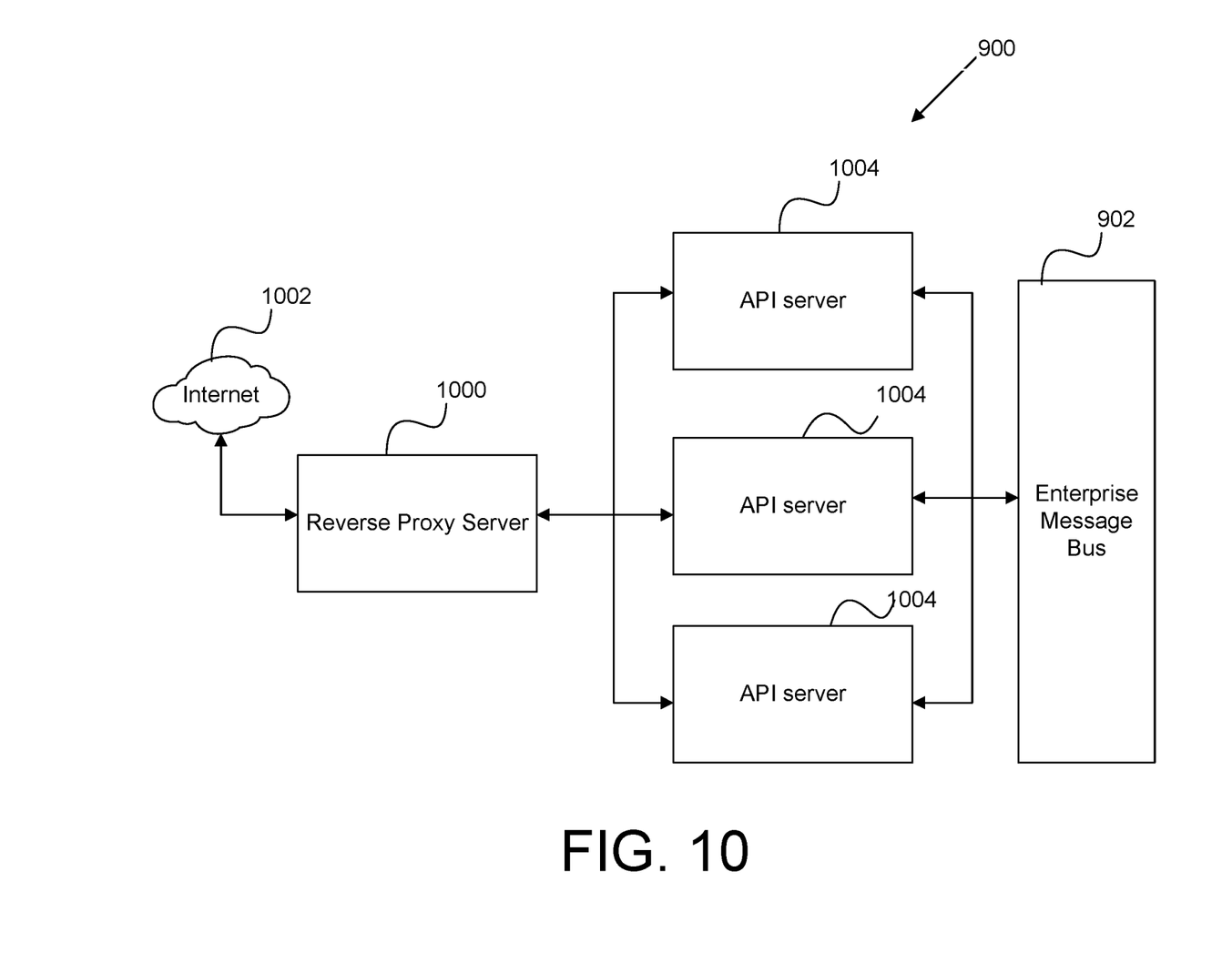
FIG. 10 is a block diagram of the public application programmable interface (API) gateway of FIG. 9.

FIG. 10 is an example of the public API gateway 900. The public API gateway 900 is a lightweight proxy gateway that sits at the boundary of a license-governing application's network. The purpose of the public API gateway 900 is to provide fast, lightweight interfaces to all the license-governing application's public storage. The public API gateway 900 provides load balancing of traffic via a reverse proxy server 1000 and static content caching to improve performance and the responsiveness of certain API features.

The reverse proxy server 1000 connects to the internet 1002 through a secure sockets layer (SSL) session, for example. The reverse proxy server 1000 also connects to a plurality of API servers 1004. Although three API servers 1004 are shown in FIG. 10, more or less API servers may be used. The API servers 1004 then communicate with the enterprise message bus 902.

Every request made through the public API gateway 900 is checked for authenticity. This is handled on two levels: an application authentication and a user authentication. The application authentication prevents unauthorized applications from accessing the license-governing application's services. The user authentication prevents unauthorized users from accessing the license-governing application's services.

As discussed above in detail, encrypted tokens may be used to handle authentication. In this manner, session states need not be tracked since all credentials are bundled inside the encrypted token. When a request is presented to the public API gateway 900, the token is decrypted and checked. If expired or invalid, the public API gateway 900 request a special token from the client application 130 for validation and then generates a new token, returning it along with the response message from the public API gateway 900.

Application tokens are presented at the beginning of a new user session and authenticated. They are static keys embedded in the binary code of the client application 130 and vary by client application 130, platform, and major release version. The token is obfuscated inside the code of the client application 130 making it difficult to find.

User tokens on the other hand are generated frequently. This reduces the likelihood of a man-in-the-middle style attack on the API services. The frequency of token generation may be controlled allowing an increased or decreased rate of token exchanges.

In some embodiments, all request and response traffic between a client application 130 and the public API gateway 900 is encrypted with an SSL tunnel.

As mentioned above, the reverse proxy server 1000 provides traffic load balancing. The reverse proxy server 1000 sits at the edge of the network and provides SSL termination of the API sessions. In some embodiments, the traffic is balanced across three or more API servers 1004, improving session concurrency, response time, and fault tolerance.

Asynchronous event driven programming is the preferred model of modern web applications and services. The public API gateway 900 accepts the request and queues it on the enterprise message bus 902 for processing by a backend service. This frees the public API gateway 900 to receive the next waiting request. When the response from the first request comes back, the public API gateway 900 sends it back to the original requestor.

This approach improves transaction throughput, allowing more requests per minute to be processed on the same amount of infrastructure resources. Concurrency, throughput, and open transaction times may see significant improvement.

Figure 11:
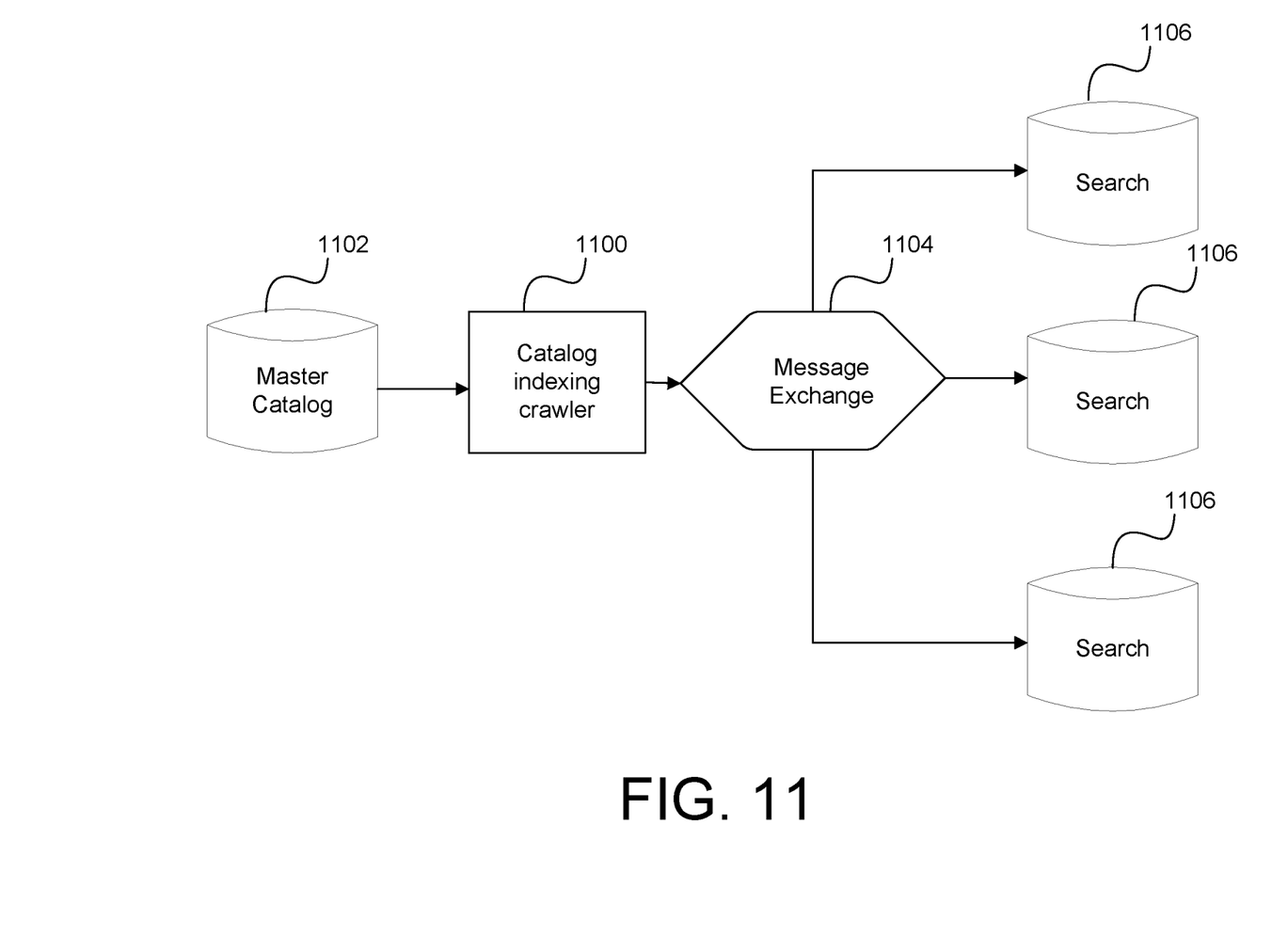
FIG. 11 is a block diagram of an exemplary enterprise message bus of FIG. 9.

FIG. 11 is an example block diagram of the enterprise message bus 902. The enterprise message bus 902 is a technology layer based on a message queueing system. Messages are routed through exchanges into queues. Services then subscribe to those queues and consume incoming messages. Responses are then sent back through a queue.

Using message queueing software is a powerful method of decoupling services from one another. A variety of message distribution can be employed depending on the technical and functional requirements of the services.

FIG. 11 illustrates an example of a fan out style message exchange which may be used as the enterprise message bus

902. In this example, a catalog indexing crawler 1100 indexes the master catalog 1102. The documents are sent through a message exchange 1104 and simultaneous distributed to three different search clusters 1106, which may be in the United States, Europe, and Australia, for example.

Another feature of many message queue systems is the ability to store copies of all the messages for replay in the event of a failure somewhere amongst the services. For instance, if user registrations for the previous 12 hours were lost from a data store for any reason, the registration messages can be replayed from the message queue archive and reprocessed by the service responsible for that data store.

Figure 12:
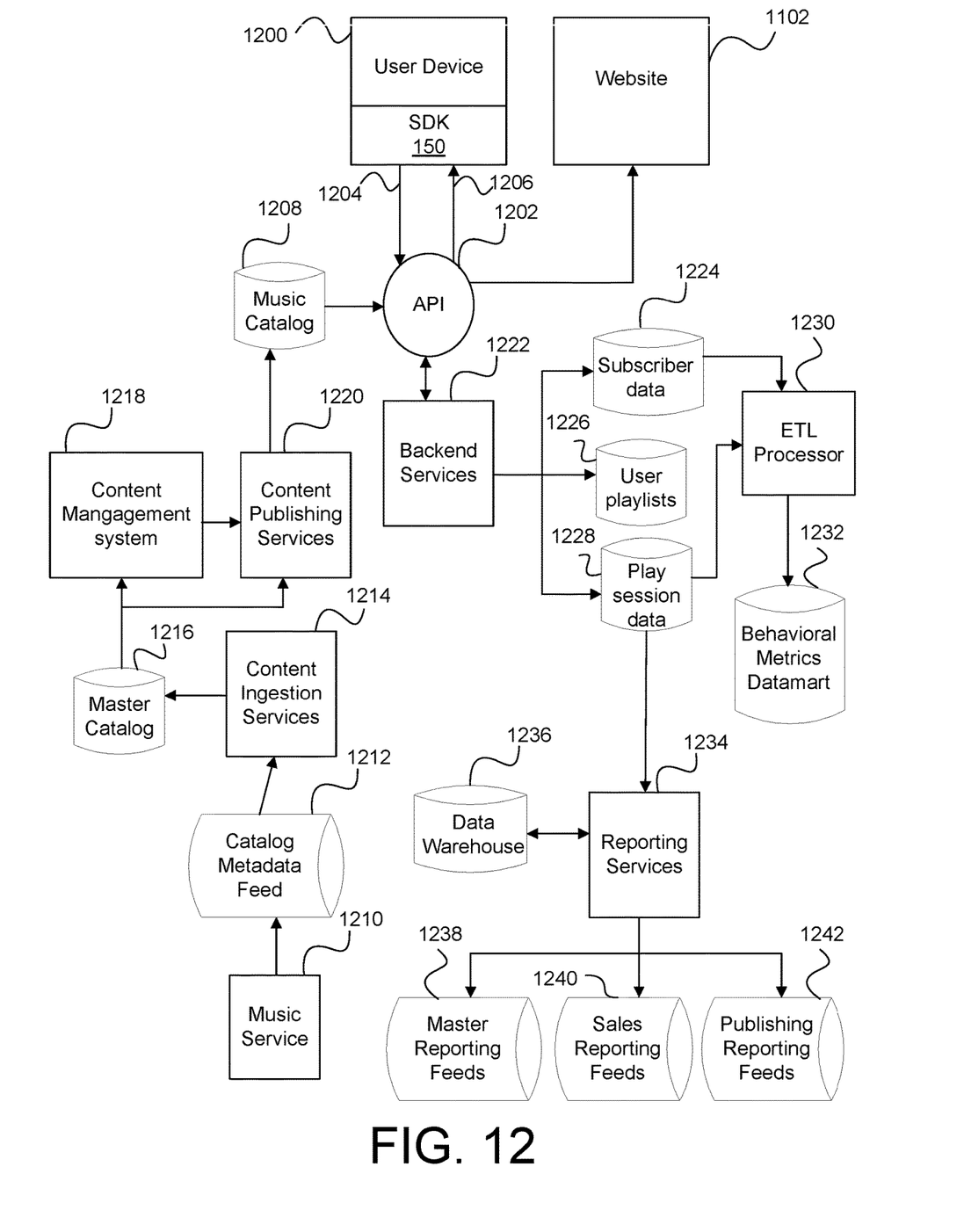
FIG. 12 is an exemplary flow chart for a content delivery system according to some embodiments of the disclosure.

FIG. 12 illustrates a flow chart for the entire content delivery platform. The user device 1200 includes a client application 130 and an SDK 150. The client application 130 communicates with the API 1202 via the SDK 150. Usage data 1204 is sent to the API 1202 and content 1206 is sent to the client device 1200 from the API 1202. The API 1202 is connected to a music catalog 1208 to receive the content to send to the user device 1200.

A music service 1210 is connected to a catalog metadata feed 1212. The catalog metadata feed 1212 is connected to a content ingestion service 1214 which is connected to a master catalog 1216. The master catalog 1216 is connected to both a content management system 1218 and a content publishing service 1220, which sends media to the music catalog 1208.

The API 1202 is also connected to backend services 1222, which is connected to subscriber data 1224, user playlists 1226 and play session data 1228. The subscriber data 1224 and the play session data 1228 are sent to an ETL processor 1230 and data is stored in a behavior metrics datamart 1232, as discussed in detail above.

The play session data 1228 is also sent to a reporting service 1234, which is connected to a data warehouse 1236, as well as master reporting feeds 1238, sales reporting feeds 1240 and publishing reporting feeds 1242.

The SDK 150 in the client device 1200 allows the client application 130 to interact with all the features of the license-governing application through the API 1202.

Examples of the invention may operate on a particularly created hardware, on firmware, digital signal processors, or on a specially programmed general-purpose computer including a processor operating according to programmed instructions. The terms "controller" or "processor" as used herein are intended to include microprocessors, microcomputers, ASICs, and dedicated hardware controllers. One or more aspects of the invention may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a computer readable storage medium such as a hard disk, optical disk, removable storage media, solid state memory, RAM, etc. As will be appreciated by one of skill in the art, the functionality of the program modules may be combined or distributed as desired in various examples. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

Aspects of the present disclosure operate with various modifications and in alternative forms. Specific aspects have been shown by way of example in the drawings and are described in detail herein below. However, it should be noted that the examples disclosed herein are presented for the purposes of clarity of discussion and are not intended to limit the scope of the general concepts disclosed to the specific examples described herein unless expressly limited. As such, the present disclosure is intended to cover all modifications, equivalents, and alternatives of the described aspects in light of the attached drawings and claims.

References in the specification to embodiment, aspect, example, etc., indicate that the described item may include a particular feature, structure, or characteristic. However, every disclosed aspect may or may not necessarily include that particular feature, structure, or characteristic. Moreover, such phrases are not necessarily referring to the same aspect unless specifically noted. Further, when a particular feature, structure, or characteristic is described in connection with a particular aspect, such feature, structure, or characteristic can be employed in connection with another disclosed aspect whether or not such feature is explicitly described in conjunction with such other disclosed aspect.

The disclosed aspects may be implemented, in some cases, in hardware, firmware, software, or any combination thereof. The disclosed aspects may also be implemented as instructions carried by or stored on one or more or computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include Random Access Memory (RAM), Read Only Memory (ROM), Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

The previously described versions of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. Where a particular feature is disclosed in the context of a particular aspect or example, that feature can also be used, to the extent possible, in the context of other aspects and examples.

Also, when reference is made in this application to a method having two or more defined steps or operations, the defined steps or operations can be carried out in any order or simultaneously, unless the context excludes those possibilities.

Although specific examples of the invention have been illustrated and described for purposes of illustration, it will be understood that various modifications may be made without departing from the spirit and scope of the invention. Accordingly, the invention should not be limited except as by the appended claims.

We claim:

1. A method for communicating between a client application and a license- governing application, comprising:
    receiving a request at a content application from the client application to access media content from the license-governing application;
    verifying at the content application that an authorization code for the client application is present;
    using the authorization code to request an access token from the license-governing application;
    receiving the access token at the content application from the license-governing application;
    determining that the client application is offline;
    granting access at the content application to the media content based on the access token by verifying that offline access to the media is authorized;
    generating a stream of media content at the content application when access is granted; and
    decrypting on-the-fly at the content application a portion of the stream of media content as the client application plays the media content without requiring full decryption of the stream of media content for access by the client application.

2. The method of claim 1, wherein decrypting a portion of the stream of media content includes decrypting the portion of the stream of stream of media content using a fixed encryption key and an initialization vector.

3. The method of claim 2, wherein the fixed encryption key includes a combination of a secret license key and a client secret key.

4. The method of claim 2, wherein the initialization vector includes a combination of a user identification and a media content identification.

5. The method of claim 1, wherein the content application communicates with the license-governing application through an application programmable interface (API).

6. The method of claim 1, further comprising:
    generating a request at the content application for a license from the license-governing application.

7. The method of claim 6, wherein the request for the license includes an application public key.

8. The method of claim 6, further comprising:
    receiving the license from the license-governing application, wherein the license is encrypted; and
    decrypting the license using a client application private key.

9. The method of claim 1, wherein the request to the license-governing application to request an access token includes an application identification, an application public key, and an application version.

* * * * *